United States Patent
Kortum et al.

(10) Patent No.: US 7,174,011 B2
(45) Date of Patent: Feb. 6, 2007

(54) TELEPHONE CALL CENTER WITH METHOD FOR PROVIDING CUSTOMER WITH WAIT TIME UPDATES

(76) Inventors: Philip T. Kortum, 10501 O'Rourk La., Austin, TX (US) 78739; Benjamin A. Knott, 8365 Liberty Walk Dr., Round Rock, TX (US) 78681; Randolph G. Bias, 1329 Braided Rope Dr., Austin, TX (US) 78727; Robert R. Bushey, 1117 Stillwell Ridge, Cedar Park, TX (US) 78613

( * ) Notice: Subject to any disclaimer, the term of this patent is extended or adjusted under 35 U.S.C. 154(b) by 543 days.

(21) Appl. No.: 10/617,486

(22) Filed: Jul. 11, 2003

(65) Prior Publication Data

US 2005/0008141 A1    Jan. 13, 2005

(51) Int. Cl.
*H04M 3/00* (2006.01)
*H04M 5/00* (2006.01)
(52) U.S. Cl. ............... 379/266.06; 379/265.02
(58) Field of Classification Search ............... 379/265.02–266.1, 76
See application file for complete search history.

(56) References Cited

U.S. PATENT DOCUMENTS

| | | | |
|---|---|---|---|
| 4,788,715 A * | 11/1988 | Lee | 379/84 |
| 5,309,505 A | 5/1994 | Szlam et al. | 379/88 |
| 5,506,898 A * | 4/1996 | Costantini et al. | 379/266.06 |
| 5,511,112 A | 4/1996 | Szlam | 379/88 |
| 6,141,328 A | 10/2000 | Nabkel et al. | 370/259 |
| 6,724,764 B2 * | 4/2004 | Bondarenko et al. | 370/401 |
| 6,728,363 B2 * | 4/2004 | Lieberman et al. | 379/266.06 |
| 2002/0105957 A1 * | 8/2002 | Bondarenko et al. | 370/401 |
| 2002/0110234 A1 * | 8/2002 | Walker et al. | 379/266.01 |
| 2002/0114442 A1 * | 8/2002 | Lieberman et al. | 379/266.06 |
| 2003/0043832 A1 * | 3/2003 | Anisimov et al. | 370/412 |
| 2003/0108187 A1 * | 6/2003 | Brown et al. | 379/266.03 |
| 2003/0231647 A1 * | 12/2003 | Petrovykh | 370/429 |
| 2005/0207559 A1 * | 9/2005 | Shtivelman et al. | 379/266.06 |

* cited by examiner

*Primary Examiner*—Benny Q. Tieu
(74) *Attorney, Agent, or Firm*—Baker Botts L.L.P.

(57) ABSTRACT

A method and system for use with a customer call center that processes telephone calls. If the customer is placed on hold at anytime during the call, the customer is provided with an audio indication that notifies the customer of expected duration of the wait time and the progress of the task that resulted in the wait.

20 Claims, 2 Drawing Sheets

TELEPHONE CALL CENTER WITH METHOD FOR PROVIDING CUSTOMER WITH WAIT TIME UPDATES

TECHNICAL FIELD OF THE INVENTION

This invention relates to call centers for providing customer service, and more particularly to a method for notifying the customer of his or her expected wait time when the customer is placed on hold.

BACKGROUND OF THE INVENTION

A business or company that provides services and/or products may provide their customers with customer service in the form of a call center that handles customer requests by telephone. Examples of customer requests are requests for new products or services, support for a product or service, or answers to questions about a product or service. In non-automated systems, when a customer calls the call center with a request, a live agent manually routes the call to another agent who handles the customer's request.

Call centers have changed greatly since they were first introduced. Nowadays, the systems which implement them usually include a large software component. They are integrated into telephone exchanges, more particularly into private branch exchanges.

Interactive Voice Response (IVR) systems are automated systems that provide information in the form of recorded messages over telephone lines in response to customer input in the form of spoken words or touch tone signaling. Examples of IVR systems are those implemented by banks, which allow customers to check their balances from any telephone, and systems for providing automated stock quotes. IVR systems generate significant cost savings due to their ability to route calls without having to incur the cost of a live agent to accomplish the routing. The automation can go beyond routing and be used to respond to the call with a fully or partially automated response system.

The automated handling of incoming customer calls can sometimes result in the customer being placed on hold. Often, when the customer is placed on hold, the customer is provided with a message that notifies the customer of an expected duration of the wait. The handling of hold times can greatly affect the level of customer satisfaction with the company.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
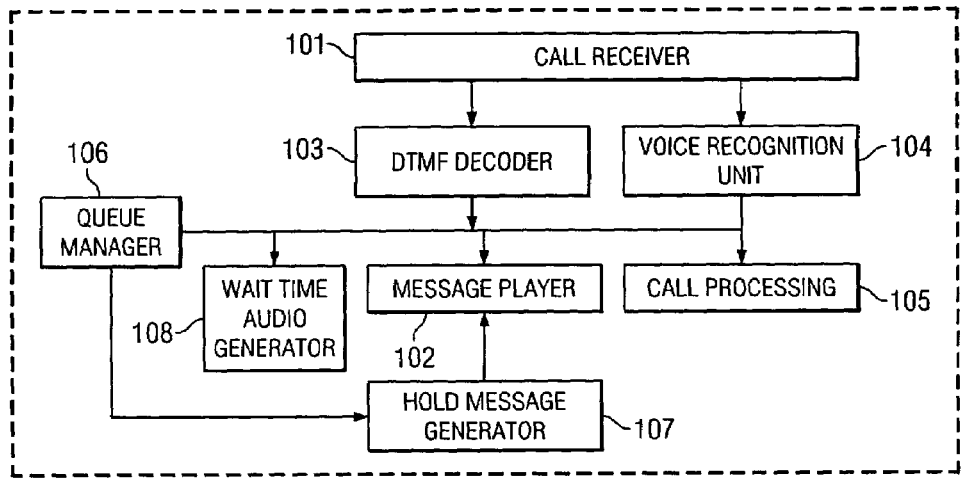
FIG. 1 illustrates a call center customer interface system having a wait time audio player in accordance with the invention.

FIG. 1 illustrates a call center customer interface system 100 having an audio wait time player 108 in accordance with the invention. In the embodiment of this description, interface system 100 is an IVR (interactive voice response) system for automated call handling, but other embodiments could use any sort of technique for recognizing and responding to customer input via telephonic communications.

It is not essential to the present invention that interface system 100 be entirely automated. Apart from the automated wait time messaging features described herein, various functions illustrated in FIG. 1 could be handled by a live agent.

As explained below, the general tasks of interface system 100 include receiving incoming calls, call progress monitoring, message playing, voice recognition and analysis, dual tone multifrequency (DTMF) decoding, and call processing. In the embodiment of this description, it is assumed that calls are customer initiated, but the same concepts could be applied to calls made to a customer during which the customer is placed on hold.

Call receiver 101 handles the initial receipt of incoming calls. Message player 102 plays an appropriate greeting and instructs the customer how next to proceed. Depending on the customer's response (DTMF or voice), the response is handled by either a DTMF decoder 103 or voice recognition unit 104.

During the call, responses are decoded and the data delivered to call processor 105, which handles the call by determining each next step in the progress of the call. For example, if the customer has requested "bill payment", call processor 105 interacts with the customer to access the appropriate billing information, provide the information to the customer, and instruct the customer how to proceed to a payment step. Call processor 105 has appropriate microprocessing, memory, input, and programming for processing customer calls. During call processing, call processor 105 instructs message player 102 to play appropriate messages, and responses are received by receiver 101 and decoded by DTMF decoder 103 and/or voice recognition unit 104.

It may happen that for some reason during call processing, a call is placed "on hold". This may occur, for example, if an incoming call cannot immediately processed by an automated call handling system, or if the customer requests an agent and an agent is not immediately available. In this case, queue manager 106 operates to manage a call queue to ensure that the call is handled in due course. The functions of queue manager 106 are not limited to finding a next available agent, and could include queue management for any system resource, such as processing time or access to data.

The functions of queue manager 106 include monitoring queue data, such as the length of the queue and average call duration. Averages may be based on any criteria, such as according to the type of call or time of day, and may be computed daily, hourly, or over any other duration.

If the customer is placed on hold, wait message player 107 composes an appropriate initial message. Subsequent messages are generated in accordance with the invention, by wait message player 107, which operates in accordance with the method of FIG. 2. This messages may include voice updates to the customer about his or her remaining expected wait time. Message/audio player 102 plays the message to the customer.

Wait time audio indicator player 108 is used to generate a second type of "message" provided to the customer. As explained below in connection with FIGS. 2 and 3, these messages are not necessarily voice messages, but rather, are primarily non verbal messages designed to provide an audio indication of the remaining wait time.

Figure 2:
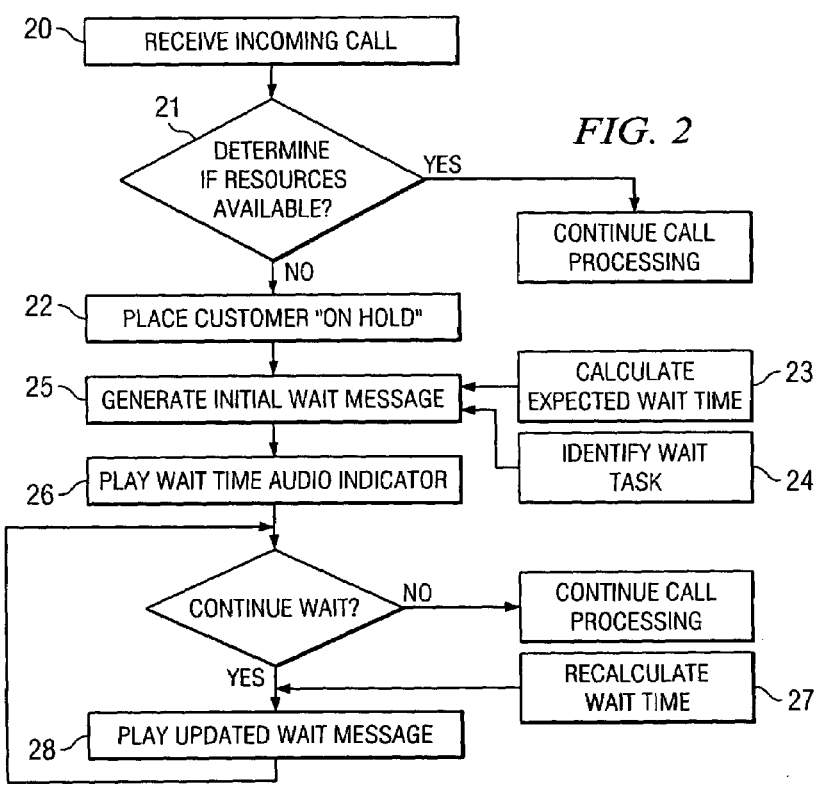
FIG. 2 illustrates a method of providing expected wait time messages in accordance with the invention.

FIG. 2 illustrates a method of generating wait messages and audio indicators in accordance with the invention. As explained below, a feature of the invention is that it provides the customer with updated notifications of the expected wait time while the customer is on hold.

Step 20 is receiving an incoming customer call at a call center. Call processing begins immediately, with an initial greeting message, interaction with the customer to determine how to route the call, and actual routing of the call. The specific request is then interactively handled, either with an agent or an automated system.

Step 21, which may occur at any time during the above described call processing, is determining whether the customer is required to wait for service. For purposes of this description, this is equivalent to determining whether the customer must wait while resources are busy before processing of his or her call can continue. The "wait" may be any time over a predetermined threshold during which the system is responding to a request.

Step 22, which occurs if the customer must endure a wait as determined by Step 21, is placing the customer "on hold". For purposes of example herein, it is assumed that the "resources" are live agents and that a hold occurs if no live agent is available. The "task" that is performed while the customer is on hold is the locating of an available agent. However, other conditions could result in a hold, such as lack of available bandwidth or processing resources. A customer might be placed on hold while a processing task is performed, such as accessing data requested by the customer. In general, in all of these cases, the wait time represents a time during which resources are busy or otherwise unavailable. The term "on hold" does not necessarily mean that the connection to the customer is altered; it simply means that the customer is waiting for a next processing event to occur.

Step 23 is calculating the expected wait time. Various algorithmic techniques may be used for this calculation. A simple example is counting the length of the queue and multiplying that count by an average call duration. Many other methods of estimating the wait time for a particular customer are possible.

Step 24 is identifying the wait task. For example, if the customer has been placed on hold because no agent is available, the wait task is routing the call to the next available agent. Another example of a wait task is retrieving database information. The identification of the wait task permits this information to be conveyed, if desired to the customer.

Step 25 is generating an initial wait message. An example of a simple initial wait message is, "We're sorry. An operator is not immediately available to assist you. Your expected wait time is 15 minutes". In this example, the customer has been notified of both the wait task and the expected wait time.

As explained below, additional wait messages may be provided during the time the customer remains on hold for the purpose of providing the customer with updated information about the remaining wait time. These may include both voice messages and non-voice (audio) signals.

Step 26 is playing a wait time audio indicator. As explained below, the audio indicator provides the customer with a status of the call center's progress in accomplishing a task, such as selecting an available agent. In general, the audio wait time indicator provides an audio signal whose pitch, tone, or rate is varied. The variation indicates the progress of the wait time, that is, the progress of the task that resulted in the wait time. The wait time indicator may be a continuous audio signal during the wait time or it may be a succession of signals.

The wait time indicator provides the customer with a reference for the wait duration, and permits the customer to make a wait or terminate decision at the onset of being placed on hold. It also provides the customer with a sense of where the customer is in the wait process.

The audio indicator is analogous to the visual indicators used in user interfaces on computers. For example, many computer interfaces use visual progress bars that fill a blank rectangle from left to right as processing progresses. The filling of the blank space represents completion of the processing. Other known visual indicators use an icon or other graphic having motion that speeds up as the processing progresses.

Step 27, repeated at least once while the customer is on hold, is recalculating the expected wait time remaining. This step may be repeated according to various timing schemes, such as once every n seconds, halfway through the expected wait time, after every change in queue position, etc.

Step 28 is playing an updated wait message to the customer. For example, the message could state, "You are now second in the queue. Your expected wait time is 2 minutes".

In the case where the customer is placed in a queue, the customer may be provided with two items of information: the number of calls ahead of the customer and the estimated wait time. The frequency with which update messages are provided may have many variations. For example, the customer could be updated each time he or she advances in the queue. As calls are dispositioned, the customer is updated about his or her position in the queue and the remaining wait time. If the time between advances is short, the updates could be made after several advances rather than after each advance. Tones could be played between voice messages, with each tone representing an advance in the queue.

The voice messaging could also be updated to alter the customer's anticipation level as the customer advances in the queue. For example, as the customer gets closer to the end of the queue, the message might state, "There are only five customers ahead of you!". Or a final message might state, "You're next!".

Figure 3:
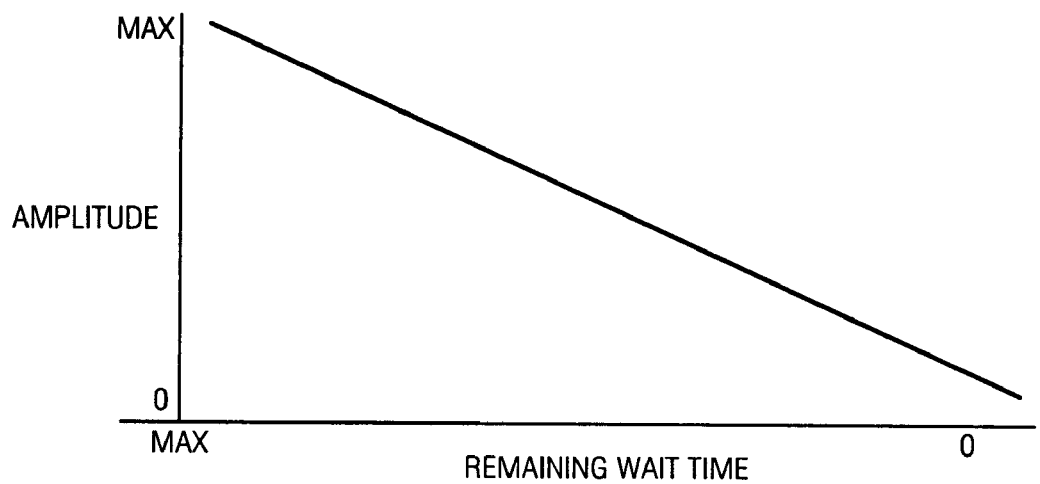
FIG. 3 illustrates an audio wait time indicator that decreases in volume as the expected wait time expires.

FIG. 3 illustrates one example of an audio indicator. As the expected wait time decreases, the customer hears a descending auditory tone. The tone goes silent when the task is complete. Alternatively, the tone could be ascending in amplitude as the expected wait time decreases. Or the tone could change in pitch, reaching a certain pitch that represents task completion. In all cases, the tone is analogous to the filling up of the visual progress bar described in the preceding paragraph.

If desired, the customer can be apprised, in an initial wait message, of the audio indication that the wait time is complete. Often however, the time to completion of the hold may be intuited by the customer from the nature of the audio indication. For a descending audio indication, the wait time is completed when the audio is no longer audible.

Figure 4:
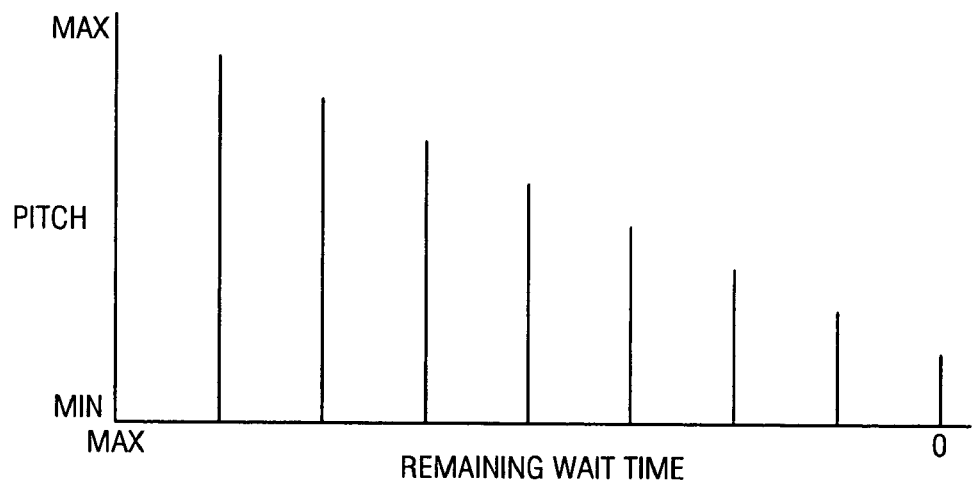
FIG. 4 illustrates an audio wait time indicator that decreases in pitch as the expected wait time expires.

FIG. 4 illustrates another example of an audio wait time indicator, which uses pattern recognition so that the customer may intuit the progress of the expected wait time. For example, the wait time indication could be the familiar "do re me fa so . . . " musical scale. The wait time would be completed with the last note.

Another example of an audio indicator is a well known piece of music. The music could be sped up or slowed down, analogously to the above-described visual indicator. When the music nears completion, the customer knows that the wait time is near completion.

The expected wait time represented by the audio wait time indicator could be calculated only once at the onset of the wait. Alternatively, the estimate of the wait time could be updated dynamically during the wait, and the audio indicator dynamically modified to represent the updated estimate.

For applications in which a visual display is also available, such as a computer or a telephone display, the audio wait time indicator may be accomplished by a visual display. The visual progress bar described above is a good example.

The methods described above give the customer valuable information abut how quickly the task resulting in the wait is progressing. This information gives greater control to the customer, increasing customer satisfaction and allowing customers to determine if they desire to hold or prefer to call again at some other time.

What is claimed is:

1. A method of providing a customer with updated wait time messages during a call to a call center, comprising the steps of:
    receiving an incoming customer call;
    calculating an expected wait time;
    playing an initial voice message informing the customer of the expected wait time;
    playing a wait time audio indicator wherein the wait time audio indicator comprises a audible signal having at least one parameter that varies with time, wherein a value of the parameter is indicative of a remaining wait time; and
    during the wait time, recalculating, at least once, the remaining expected wait time.

2. A method of providing a caller with updated wait time messages during a call to a call center, comprising the steps of:
    at any time during a call from a caller, determining whether resources of the call center are available to further process the call;
    if resources are available, continuing to process the call;
    if resources are not available, placing the caller on hold;
    calculating an expected wait time; and
    playing a wait time audio indicator comprising an audible signal having an audible characteristic that varies as a function of the expected wait time wherein an instantaneous value of the characteristic is indicative of the expected wait time.

3. The method of claim 2, further comprising the steps of, during the wait time, recalculating, at least once, the remaining expected wait time, and of providing the caller with at least one voice update message that informs the caller of the remaining expected wait time.

4. The method of claim 3, wherein the providing step is repeated when the caller advances in a queue.

5. The method of claim 3, wherein the voice update message is provided when a caller advances in a queue.

6. The method of claim 3, wherein the voice update message is provided at intervals during the hold.

7. The method of claim 2, wherein the characteristic that varies is a pitch of the audible signal.

8. The method of claim 2, wherein the characteristic that varies is a tone of the audible signal.

9. The method of claim 2, wherein the characteristic that varies is an amplitude of the audible signal.

10. The method of claim 2, wherein the placing step is in response to a routing queue, and wherein the calculating step is performed by multiplying a queue length times an average wait time.

11. The method of claim 2, further comprising the step of playing an initial voice message informing the caller of the expected wait time.

12. The method of claim 11, wherein the initial voice message apprises the caller of the operation of an audio wait time indicator.

13. The method of claim 2, further comprising the step of recalculating the expected wait time and modifying the wait time audio indicator in response to the recalculating step.

14. The method of claim 2, wherein the audio signal comprises a non-speech signal.

15. The method of claim 14, wherein the audio signal characteristic is substantially continuously audible and varies as a function of the expected wait time.

16. An automated call center for processing customer calls, comprising:
    a call receiving unit for receiving telephonic input from a customer;
    a DTMF receiver for decoding DTMF signals input by the customer; a queue manager
    operable to calculate an expected wait time for customers on hold;
    a wait message generator for generating voice wait time messages; and
    a wait time audio generator for generating audio signals having a substantially continuously audible characteristic that varies during a hold time wherein the value of the audible characteristic at any time is indicative of the expected wait time.

17. The system of claim 16, wherein the queue manager is farther operable to update expected wait times during customer holds.

18. The system of claim 16, wherein the wait time audio generator generates an audio signal that changes in pitch during the progress of the wait.

19. The system of claim 16, wherein the wait time audio generator generates an audio signal that changes in tone during the progress of the wait.

20. The system of claim 16, wherein the wait time audio generator generates an audio signal that changes in amplitude during the progress of the wait.

* * * * *

UNITED STATES PATENT AND TRADEMARK OFFICE
CERTIFICATE OF CORRECTION

| | | |
|---|---|---|
| PATENT NO. | : 7,174,011 B2 | Page 1 of 1 |
| APPLICATION NO. | : 10/617486 | |
| DATED | : February 6, 2007 | |
| INVENTOR(S) | : Philip T. Kortum et al. | |

It is certified that error appears in the above-identified patent and that said Letters Patent is hereby corrected as shown below:

Col. 5, line 25, should read:

1. A method of providing a customer with updated wait time messages during a call to a call center, comprising the steps of:
　　　　receiving an incoming customer call; calculating an expected wait time;
　　　　playing an initial voice message informing the customer of the expected wait time;
　　　　playing a wait time audio Indicator wherein the wait time audio indicator comprises ~~a audible~~ an audible signal having at least one parameter that varies with time, wherein a value of the parameter is indicative of a remaining wait time; and
　　　　during the wait time, recalculating, at least once, the remaining expected wait time.

Col. 6, line 30, should read:

16. An automated call center for processing customer calls, comprising:
　　　　a call receiving unit for receiving telephonic input from a customer;
　　　　a DTMF receiver for decoding DTMF signals input by the customer; ~~a queue manager operable to calculate an expected wait time for customers on hold;~~
　　　　a queue manager operable to calculate an expected wait time for customers on hold;
　　　　a wait message generator for generating voice wait time messages; and
　　　　a wait time audio generator for generating audio signals having a substantially continuously audible characteristic that varies during a hold time wherein the value of the audible characteristic at any time is indicative of the expected wait time.

Signed and Sealed this

Sixteenth Day of October, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,174,011 B2 | Page 1 of 1 |
| APPLICATION NO. | : 10/617486 | |
| DATED | : February 6, 2007 | |
| INVENTOR(S) | : Philip T. Kortum et al. | |

It is certified that error appears in the above-identified patent and that said Letters Patent is hereby corrected as shown below:

On the Title Page:

Add the following:

(73)      Assignee:      AT&T Knowledge Ventures, L.P., Reno, NV (US)

Signed and Sealed this

Twenty-third Day of December, 2008

JON W. DUDAS
*Director of the United States Patent and Trademark Office*